Aug. 3, 1965 J. L. HALBERT, JR 3,198,941
ANALOG COMPUTER
Filed Aug. 27, 1962
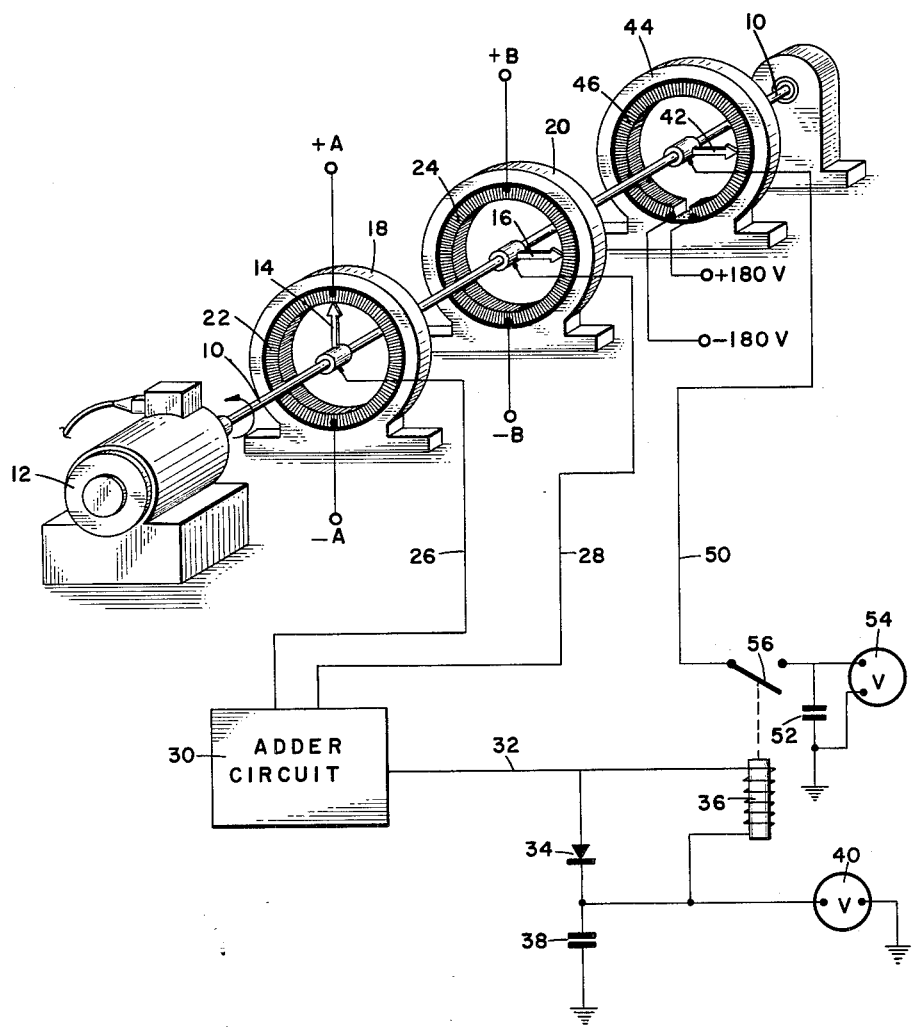
INVENTOR.
JOSHUA L. HALBERT, JR.
BY Frank S. Troidl
ATTORNEY

United States Patent Office 3,198,941
Patented Aug. 3, 1965

3,198,941
ANALOG COMPUTER
Joshua L. Halbert, Jr., Houston, Tex., assignor, by mesne assignments, to Esso Production Research Company, Houston, Tex., a corporation of Delaware
Filed Aug. 27, 1962, Ser. No. 219,600
4 Claims. (Cl. 235—191)

This invention relates to analog computers. More particularly, this invention is an analog computer for giving the solutions of right triangles.

In making frequency analyses of signals, such as pulses, it is often desirable to find both the amplitudes and the phase angles of the various sine wave components of which the signals are composed. Devices are available which will give the amplitudes of the sine and cosine components of the various frequencies.

The computer to be described herein is an improved computer for combining the amplitudes of the sine and cosine components of various freqencies and giving the resultant amplitude and phase angle of the equivalent sine wave.

The invention, as well as its many advantages, will be understood by reference to the following detailed description and single figure which is a schematic diagram illustrating one embodiment of my invention.

Referring to the figure, a shaft 10 is shown which may be rotated by means such as the motor 12. Connected to the shaft 10 is a pair of electrical wipers 14 and 16. Wipers 14 and 16 are longitudinally spaced along the shaft 10 and arcuately spaced from one another by a 90° angle.

Potentiometer housings 18 and 20 are rigidly mounted so as to be coaxial with the shaft 10. Coils 22 and 24 are wound within the housings 18 and 20, respectively.

The coils 22 and 24 are wound within the protentiometer housings 18 and 20 in a manner such that the voltages on the corresponding wipers 14 and 16 are proportional to the sine of the angles through which the wipers have rotated with the position in which wiper 16 is shown being considered zero angle.

Conducting lines 26 and 28 lead from the wipers 14 and 16, respectively, to an adder circuit 30. The adder circuit 30 is conventional in structure and is similar to the adder circuit shown in Fig. 2.2, page 16, Applications Manual for Philbrick Octal Plug-In Computing Amplifiers, 1956.

The output from the adder circuit 30 is fed through line 32 to a parallel arrangement of a diode 34 and relay 36, the diode 34 and relay 36 being in series with condenser 38. A voltmeter 40 is connected across the condenser 38.

A third wiper 42 is also connected to the rotatable shaft 10 and longitudinally spaced from the wiper 16. Arcuately, however, the wiper 42 is along the same line as wiper 16.

A potentiometer 44 is rigidly mounted so as to be coaxial with the shaft 10. A coil 46 is wound within the housing 44 in such a manner that the voltage on wiper 42 is proportional to the number of degrees the wiper is located from the upright position.

Conducting line 50 leads from the wiper 42 to a parallel arrangement of a condenser 52 and voltmeter 54. The current through line 50 is controlled by a normally open switch 56. Switch 56 is controlled by the operation of relay 36 as indicated by the broken line.

In operation, voltages +A and −A are fed into the potentiometer 18. The voltage on the wiper 14 is $A$ sine $\theta$ where $\theta$ is the angle through which the wiper is rotated. The other voltages +B and −B are fed into potentiometer 20. Potentiometer 20 is wound similarly to potentiometer 18, but the wiper 16 is retarded 90° with respect to the wiper 14.

If desired, the voltage across the linear potentiometer 44 may range from +180 v. to −180 v. Thus, the voltage on the wiper 42 is equal to the number of degrees the wiper is from the straight-up position.

The shaft 10 is rotated by the motor 12. The speed of the motor is not critical, but the shaft should make more than one revolution before the values of A and B are changed.

With the motor 12 running at some speed, say 10 revolutions per value of A and B, the voltage on wiper 14 is $A$ sine $\omega t$. The voltage on the wiper 16 is $B$ cosine $\omega t$.

The two voltages, A sine $\omega t$ and B cosine $\omega t$, are added in the adder circuit 30. The output from the adder circuit 30 is $R$ sine $(\omega + \phi)$, where $R = \sqrt{A^2 + B^2}$ = resultant amplitude and $$\phi = \tan^{-1} \frac{A}{B}$$

Diode 34 and condenser 38 serve to rectify the adder circuit output and charge the condenser 38 to R volts which is read on the voltmeter 40. The charge is held on the condenser 38 for several revolutions of the shaft 10. During each revolution, the voltage across the diode 34 and the relay 36 goes from zero to 2R and back to zero.

The relay 36 is wound so that with current flowing through the relay coils the switch 56 is held open. Thus, the relay 36 holds switch 56 open during each revolution except when the voltage across the relay 36 falls to zero. At zero voltage, the relay 36 is de-energized; the switch 56 is closed to sample the voltage on the wiper 42 of the linear potentiometer 44. This voltage is equal to the number of degrees between the straight-up position and the actual position of the wiper 16 on potentiometer coil 24.

Inasmuch as the voltage across the diode 34 and relay 36 is zero only when the voltage is a positive maximum (corresponding to the straight-up position of the vector representing the resultant voltage), the voltage thus sampled and read on voltmeter 54 is equal to the phase angle betwen the resultant and the voltage B.

The condenser 52 is used to hold the sampled voltage for another revolution of the shaft 10 and thus stabilize the reading of the voltmeter 54.

I claim:

1. In an analog computer including a rotatable shaft, a pair of electrical wipers mounted on the shaft, said wipers being arcuately spaced by a 90° angle, a pair of rigid potentiometers mounted so as to be coaxial with the shaft, each potentiometer having a coil therein wound so that the voltage on the corresponding wiper is proportional to the sine of the angle through which the wiper has rotated, an adder circuit for adding the voltages from said wipers and producing an output signal, means for indicating the maximum output voltage from the adder circuit thus indicating the resultant amplitude of the input voltages to said pair of potentiometers, a third wiper mounted on said shaft and arcuately lined up with one of the other two wipers, a third rigid potentiometer mounted so as to be coaxial with the shaft, said third potentiometer having a coil therein wound so that the voltage on the third wiper is proportional to the number of degrees the wiper is from a predetermined position, the improvement comprising:

a voltage indicating means;

a normally open switch in a line leading from the third wiper to said voltage indicating means; and means operated at substantially the same time as the output voltage from the adder circuit is at a maximum to close said normally open switch whereby the phase angle between said resultant and the input voltage to the potentiometer having the wiper lined up with said third wiper is indicated.

2. An analog computer in accordance with claim 1 wherein the means for indicating the maximum output voltage from the adder circuit is a rectifier in series with a condenser which is charged by the output voltage from the adder circuit and a voltmeter connected across the condenser.

3. An analog computer in accordance with claim 1 wherein the means operated to close the normally open switch is a relay connected across a rectifier in the adder circuit output.

4. In an analog computer including a rotatable shaft, a pair of electrical wipers mounted on the shaft, said wipers being arcuately spaced by a 90° angle, a pair of rigid potentiometers mounted so as to be coaxial with the shaft, each potentiometer having a coil therein wound so that voltage on the corresponding wiper is proportional to the sine of the angle through which the wiper has been rotated, an adder circuit for adding the voltages from said wipers and producing an output signal, a condenser connected across the output from the adder circuit, a voltmeter connected across the condenser to indicate the resultant amplitude of the input voltages to said pair of potentiometers, a third wiper mounted on said shaft and arcuately lined up with one of the other two wipers, a third rigid potentiometer mounted so as to be coaxial with the shaft, said third potentiometer having a coil therein wound so that the voltage on the third wiper is proportional to the number of degrees the wiper is from a predetermined position, the improvement comprising:

a relay also connected across the output from the adder circuit;
    a second voltmeter;
    a condenser connected across the second voltmeter; and
    a normally open switch operated by said relay and adapted to control the flow of current from the third wiper to the second voltmeter, said switch being closed by the relay each time the voltage across the relay falls to zero, whereby the voltage on said second voltmeter indicates the phase angle between said resultant and the input voltage to the potentiometer having the wiper lined up with said third wiper.

References Cited by the Examiner

UNITED STATES PATENTS

| | | | |
|---|---|---|---|
| 2,688,442 | 9/54 | Droz et al. | 235—192 |
| 2,965,299 | 12/60 | Gordon | 235—186 |

MALCOLM A. MORRISON, *Primary Examiner.*